United States Patent
Calmels (10) Patent No.: US 9,317,633 B2
(45) Date of Patent: Apr. 19, 2016

(54) SIMULATION METHOD FOR DETERMINING AERODYNAMIC COEFFICIENTS OF AN AIRCRAFT

(75) Inventor: Benoit Calmels, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 406 days.

(21) Appl. No.: 13/882,446

(22) PCT Filed: Nov. 2, 2011

(86) PCT No.: PCT/FR2011/052558
§ 371 (c)(1),
(2), (4) Date: Apr. 29, 2013

(87) PCT Pub. No.: WO2012/059688
PCT Pub. Date: May 10, 2012

(65) Prior Publication Data
US 2014/0195210 A1    Jul. 10, 2014

(30) Foreign Application Priority Data

Nov. 3, 2010   (FR) ...................................... 10 59047

(51) Int. Cl.
*G01M 9/08* (2006.01)
*G06F 17/50* (2006.01)
*G05D 1/08* (2006.01)

(52) U.S. Cl.
CPC .............. *G06F 17/5009* (2013.01); *G01M 9/08* (2013.01); *G05D 1/0808* (2013.01); *G06F 17/5095* (2013.01); *G06F 2217/16* (2013.01)

(58) Field of Classification Search
None
See application file for complete search history.

(56) References Cited

U.S. PATENT DOCUMENTS

| | | | |
|---|---|---|---|
| 6,553,333 B1* | 4/2003 | Shenk | 702/182 |
| 6,721,682 B1* | 4/2004 | Moore et al. | 702/182 |
| 6,813,942 B1* | 11/2004 | Vozhdaev | G01P 13/025 73/170.02 |
| 7,236,914 B1* | 6/2007 | Zyskowski | G06F 17/5009 434/30 |
| 8,442,705 B2* | 5/2013 | Giesseler et al. | 701/14 |
| 9,011,152 B2* | 4/2015 | Yudintsev | G09B 9/302 434/29 |
| 2009/0157364 A1* | 6/2009 | Velazquez Lopez et al. | 703/8 |
| 2009/0171634 A1* | 7/2009 | Bensch et al. | 703/2 |
| 2009/0314076 A1* | 12/2009 | Calmels | 73/147 |

(Continued)

OTHER PUBLICATIONS

J. C. Vassberg, A. Jameson, "In Pursuit of Grid Convergence for Two-Dimensional Eauler Solutions" pp. 1152-1166, 2010.*

(Continued)

*Primary Examiner* — Kibrom K Gebresilassie
(74) *Attorney, Agent, or Firm* — Greer, Burns & Crain, Ltd.

(57) ABSTRACT

A computer method of simulating a fluid flow in an aircraft environment to determine at least one aerodynamic coefficient, comprising obtaining a first series of values of the aerodynamic coefficient. The method also includes defining a criterion for convergence of said aerodynamic coefficient, selecting a determined set of terms belonging to said first series, defining a monotonic function configured to make a relatively expanding transformation in said determined set relative to the complement of said set, applying said monotonic function on said first series to form a second series of values of the aerodynamic coefficient, determining said aerodynamic coefficient by plotting a variation curve representative of said second series of values of the aerodynamic coefficient, and displaying said variation curve including an intrinsic zoom of the convergence zone of said aerodynamic coefficient.

13 Claims, 7 Drawing Sheets

(56) References Cited

U.S. PATENT DOCUMENTS

| | | | |
|---|---|---|---|
| 2010/0121609 A1* | 5/2010 | Gorinevsky | 702/183 |
| 2010/0222945 A1* | 9/2010 | Giesseler et al. | 701/14 |
| 2010/0256962 A1* | 10/2010 | Calmels | G06F 17/5095 703/8 |
| 2010/0280802 A1* | 11/2010 | Calmels | 703/2 |
| 2011/0184591 A1* | 7/2011 | Kordt | 701/3 |
| 2011/0246097 A1* | 10/2011 | Mangalam | 702/43 |
| 2012/0173219 A1* | 7/2012 | Rodriguez | G06F 17/5018 703/9 |
| 2012/0245910 A1* | 9/2012 | Rajnarayan | G06F 17/5018 703/9 |
| 2012/0296500 A1* | 11/2012 | Yamasaki | G01M 9/06 701/14 |

OTHER PUBLICATIONS

G. May, F. Iacono, A. Jameson, "A hybrid multilevel method for high-order discretization of the Euler equations on unstructured meshes" pp. 3938-3956, 2010.*

A hybrid multilevel method for high-order discretization of the Euler equations on unstructured meshes, May G. et al., May 20, 2010.

Search Report, Feb. 14, 2012.

* cited by examiner

SIMULATION METHOD FOR DETERMINING AERODYNAMIC COEFFICIENTS OF AN AIRCRAFT

CROSS-REFERENCES TO RELATED APPLICATIONS

This application claims the benefit of the French patent application No. 10 59047 filed on Nov. 3, 2010, the entire disclosures of which are incorporated herein by way of reference.

BACKGROUND OF THE INVENTION

This invention relates to the general domain of aerodynamics and concerns digital simulation of aerodynamic flows for an aircraft.

Its application lies in the aeronautic field for which the design of an aircraft requires precise knowledge of aerodynamic coefficients associated with its various elements.

When designing an aircraft, an attempt is made to determine global aerodynamic coefficients associated with its various elements, for example coefficients associated with the wings such as lift, drag and the pitching moment.

These coefficients can be determined in different ways, particularly by digital simulation of fluid flows that consists of analysing movements of a fluid or the effects of these movements by digital solution of equations governing the fluid.

A digital model is chosen to reproduce the fluid flow in a zone in space that surrounds an element of the aircraft. This zone in space is called the geometric domain of the fluid or calculation domain.

Digital simulation is used to determine physical values (for example speed, pressure, temperature, density, etc.) for each point in the calculation domain, for a global cost usually much lower than wind tunnel or flight tests.

The equations to be solved can be very varied depending on the chosen approximations that are usually the result of a compromise between the need for a physical representation and the calculation load, the equations most frequently used being Euler equations (representing a non-viscous adiabatic fluid) and Navier-Stokes equations (representing a viscous heat conducting fluid). Navier-Stokes equations are usually averaged and complemented by turbulence models.

These equations are digitally solved by computers, using meshes discretising the geometric domain of the fluid to be studied and digital schemes that replace the continuous form of equations by discrete forms. This solution is usually made iteratively, in other words starting from an initial state (for example corresponding to a uniform flow) and performing successive calculation iterations consisting of calculating the next state from the current state.

Ideally, this iterative method should lead to a state that no longer changes as more iterations are carried out and corresponds to a rigorous solution of discretised equations. In practice, this state is not achieved regardless of the number of iterations made and the simulation has to be stopped as a function of specific criteria, for example after reaching a number of iterations fixed in advance or when the difference between two successive states is less than a given quantity.

The convergence quality of a digital simulation of aerodynamic flows can be evaluated based on plots of changes to aerodynamic coefficients made at a linear scale. The values of an aerodynamic coefficient can be positive, negative or zero and their convergence towards a previously unknown value is studied.

The use of a linear scale for the plot of the change to aerodynamic coefficients combined with the fact that this change normally converges, results in a plateau being obtained on the plot of the curve, which is interpreted as a demonstration of convergence.

Nevertheless, with this type of plot, it is difficult to see precisely how these coefficients change in the plateau, which makes a precise analysis of the simulation convergence more difficult.

Zooms of the plot then have to be made frequently, but this has the disadvantage of requiring manual work to use plotting software and a large calculation workload. Furthermore, these zooms are impossible if all that is available are plots printed on paper.

The purpose of this invention is to disclose a method for simulating fluid flows to determine changes to aerodynamic coefficients correcting the above-mentioned disadvantages.

SUMMARY OF THE INVENTION

This invention is defined by a computer method of simulating a fluid flow in an aircraft environment to determine at least one aerodynamic coefficient characterising the aerodynamic behaviour of at least one element of the aircraft, said method comprising a digital solution of equations modelling the fluid flow in said environment, according to a model configured using physical parameters of the fluid, said digital solution being made iteratively to obtain a first series of values of the aerodynamic coefficient indexed by the number of iterations, said method also comprising the following steps:

defining a criterion for convergence of said aerodynamic coefficient, selecting a determined set of terms belonging to said first series of values of the aerodynamic coefficient, as a function of said convergence criterion, defining a monotonic function configured to make a relatively expanding transformation in said determined set relative to the complement of said set;

applying said monotonic function on said first series to form a second series of values of the aerodynamic coefficient, said second series defining a global change to said aerodynamic coefficient with a local expansion in a convergence zone corresponding to said determined set;

determining said aerodynamic coefficient by plotting a variation curve representative of said second series of values of the aerodynamic coefficient as a function of the number of iterations, and displaying said variation curve including an intrinsic zoom (or magnification) of said convergence zone giving details of the convergence of said aerodynamic coefficient.

Thus, the method is capable of globally analysing changes to the aerodynamic coefficient, while making a detailed analysis of its behaviour in the attraction or convergence zone. This makes it possible to quickly and very precisely evaluate the stationary value of the aerodynamic coefficient and the degree of convergence of the digital simulation. It is no longer necessary to make magnifications to determine the aerodynamic coefficient.

According to one aspect of this invention, said convergence criterion is defined as a function of a predetermined number of iterations.

This can give a direct magnification in the zone of interest to provide a more adapted curve.

According to another aspect of this invention, said predetermined number of iterations corresponds to a total number of iterations.

When the total number of iterations fixed in advance is reached, the solution becomes closer and closer to convergence, in other words to the stationary state of the real flow.

Advantageously, the cardinality of said determined set is defined as a function of a predetermined order of magnitude of the aerodynamic coefficient.

This means that the simulation can be detailed in a zone for which the extent and precision are chosen based on considerations about the type and expected order of magnitude of the aerodynamic coefficient.

Advantageously, said monotonic function corresponds to a mixed linear-logarithmic transformation with a linear behaviour in said determined set and a logarithmic behaviour outside said determined set defined as follows:

$F(x)=x/10^p si |x| \leq 10^p$ and $F(x)=\text{sign}(x) \cdot \log_{10}(|x|/10^{p-1}) si |x| > 10^p$, where p is an order of magnitude of precision.

This mixed linear-logarithmic transformation has the advantage of facilitating implementation and familiarity of interpretation for users.

Advantageously, the method comprises the addition of a constant to each term in the first series before application of said monotonic function, said constant being equal to the value of the aerodynamic coefficient at said determined number of iterations.

This further facilitates the evaluation of the convergence of the aerodynamic coefficient by making the series tend towards zero.

Advantageously, the method also comprises the application of an absolute value operation on the terms of said second series to form a third series of positive terms.

This simplifies determination of convergence of the aerodynamic coefficient.

Advantageously, the method also comprises the following steps:

applying an oscillation filtering operation on said third series to form a fourth monotonic series; and plotting a positive and monotonic variation curve representative of said fourth series.

According to one example of this invention, the method comprises the following steps:

plotting a preliminary variation curve $C0(I)$ representative of said first series of values of the aerodynamic coefficient as a function of the number of iterations;

defining at least one interval of values of the aerodynamic coefficient corresponding to said determined set;

applying said mixed linear-logarithmic monotonic function on said preliminary variation curve operating a linear transformation inside said interval and a logarithmic transformation outside said interval to form said variation curve.

According to one embodiment of this invention, the method comprises the following steps:

calculating a final value $C_{0final}=C_0(I_{max})$, a maximum value $C_{0max}=\max(C_0(I))$, and a minimum value $C_{0min}=\min(C_0(I))$ of said preliminary variation curve $C_0(I)$ recursively defining a fifth decreasing series $I_0^p$, $I_0^{p+1}, \ldots, I_0^i, \ldots, I_0^{m-1}, I_0^m$ such that $I_0^i > C_{0min} \forall i \in [p, m-1]$, $I_0^m \leq C_{0min}$, $I_0^p = M_0^p - 10^p$, and $M_0^p \approx C_{0final}$ to the nearest 10p, where p is an order of magnitude of precision, recursively defining a sixth increasing series $S_0^p$, $S_0^{p+1}, \ldots, S_0^i, \ldots, S_0^{n-1}, S_0^n$, such that $S_0^i < C_{0max} \forall i \in [p, n-1]$, $S_0^n \geq C_{0max}$ and $S_0^p = M_0^p + 10^p$, defining a seventh ordered series as a function of said fifth and sixth series: $I_0^m < I_0^{m-1} < \ldots < I_0^i < \ldots < I_0^{p+1} < I_0^p < M_0^p < S_0^p < S_0^{p+1} \ldots < S_0^i < \ldots < S_0^{n-1} < S_0^n$.

defining a lower interval, $[I_0^m I_0^p]$, a median interval $[I_0^p, S_0^p]$, and an upper interval $[S_0^p, S_0^n]$, applying said mixed linear-logarithmic monotonic function on said preliminary variation curve using said seventh ordered series to form said variation curve as follows:

$C_2'(I) = F(C_0(I) - M_0^p)$ $I_2^i = F(I_0^i - M_0^p) \forall i \in [p, m]$ $S_2^i = F(S_0^i - M_0^p) \forall i \in [p, n]$ $M_2^p = F(M_0^p - M_0^p) = F(0) = 0$.

According to another embodiment of this invention, the method comprises the following steps:

translating said preliminary variation curve by the value of the aerodynamic coefficient at the total number of iterations to form an intermediate variation curve, determining a high order of magnitude m relative to said intermediate variation curve, defined as being the relative integer m such that:

$10^{m-1} < \max|C_1(I)| \leq 10^m$, and defining said interval by extremities equal to $-10p$ and $10p$ where p is an order of magnitude of precision that is strictly less than said high order of magnitude m, and applying said mixed linear-logarithmic monotonic function on said intermediate variation curve using said ordered series to form said variation curve as follows:

$C_2'(I) = C_1(I) \cdot 10^{-p}$ for $|C_1(I)| \leq 10^p$, and $C_2'(I) = \text{sign}(C_1(I)) \cdot [\log_{10}(|C_1(I)|) - p + 1]$ for $|C_1(I)| > 10^p$.

Advantageously, the method comprises the following steps:

applying an absolute value on said variation curve to form a positive variation curve C3(I), and plotting a positive monotonic variation curve C4(I) using a recurrence calculation for I decreasing between Imax and 1, according to the following equations:

$C_4(I_{max}) = C_3(I_{max})$ $C_4(I) = \max(C_3(I), C_4(I+1))$ pour $I \neq I_{max}$ The invention also relates to a computer program comprising code instructions for use of the simulation method according to any one of the above characteristics when it is run on a computer.

Other advantages and characteristics of the invention will become clear by reading the non-limitative detailed description given below.

BRIEF DESCRIPTION OF THE DRAWINGS

We will now describe embodiments of the invention by means of non-limitative examples with reference to the appended drawings among which.

DETAILED DESCRIPTION OF THE PREFERRED EMBODIMENTS

The basic concept of the invention is to determine the variation of aerodynamic coefficients using a type of plot systematically including a zoom of the convergence zone.

Figure 1:
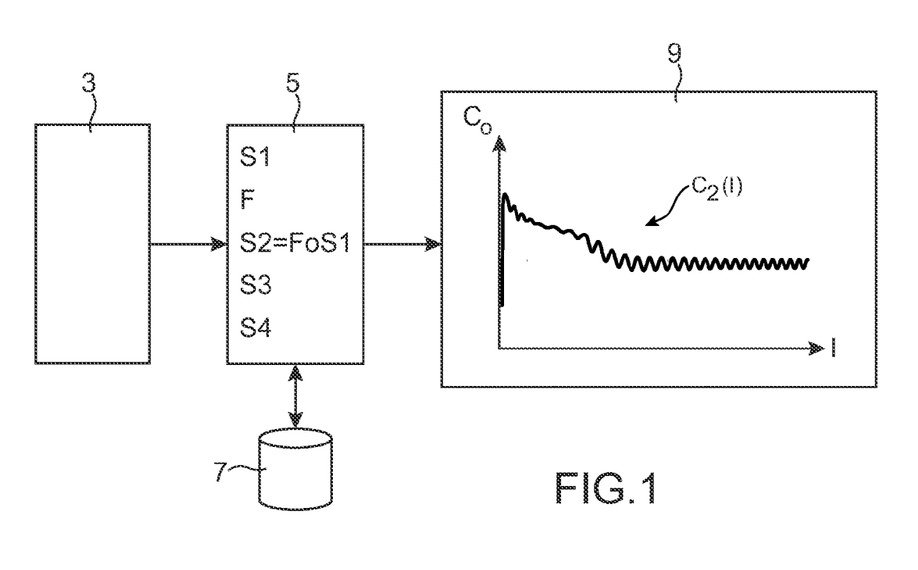
FIG. 1 diagrammatically shows a computer system that can be used to create a fluid flow simulation method, in order to determine at least one aerodynamic coefficient related to an aircraft according to the invention.

FIG. 1 diagrammatically shows a computer system 1 that can be used in a method for simulating fluid flows, to determine at least one aerodynamic coefficient for an aircraft, according to the invention.

Each aerodynamic coefficient characterises a specific aerodynamic behaviour of one or several elements of the aircraft. For example, the aerodynamic coefficient may correspond to the lift, drag or pitching moment of the aircraft wings.

The computer system 1 may be composed of a computer normally comprising input means 3, processing means 5, storage means 7 and output means 9.

The storage means 7 may comprise one or several computer programs including code instructions for implementation of the method according to the invention when the computer program(s) is (are) run by the computer system 1.

The computer system 1 is used to digitally solve equations modelling the fluid flow in the aircraft environment according to a parameter-defined model using Euler or Navier-Stokes type physical parameters, reproducing the fluid flow in the aircraft environment.

This well known model comprises a set of equations modelling the fluid flow in the aircraft environment as a function of physical parameters of the fluid, for example comprising a density, a velocity field, a pressure field, a temperature field, an external volume force such as gravity, a dynamic viscosity, a specific heat at constant volume, a dissipation rate by viscosity, and thermal conductivity of the fluid.

The digital solution uses meshes to discretise the fluid geometric domain by replacing the continuous form of equations by discrete forms. This solution is done iteratively, calculating the next value of the aerodynamic coefficient from a current value to determine a first series S1 of values of the aerodynamic coefficient indexed by the number of iterations.

In accordance with the invention, the processing means 5 are configured to define a convergence criterion for the aerodynamic coefficient and to select a determined set of terms belonging to the first series of values of the aerodynamic coefficient as a function of the convergence criterion. This determined set may for example be formed of at least one interval.

Advantageously the convergence criterion is defined as a function of a predetermined number of iterations which may for example correspond to the total number of iterations fixed in advance. Furthermore, the size or cardinality of this determined set may be calculated as a function of the type, a predetermined order of magnitude or the required precision of the aerodynamic coefficient.

The processing means 5 also define a monotonic function F configured to perform a relatively expanding transformation in the determined set relative to the complement of this set. For example, the transformation may be locally expanding and homothetic inside the determined set and contracting outside this set.

More particularly, the monotonic function F may correspond to a mixed linear-logarithmic transformation with a linear behaviour in the determined set and a logarithmic behaviour outside this set.

The processing means 5 then apply this monotonic function F onto the first series S1 to form a second series S2 of values of the aerodynamic coefficient. The second series S2 thus defines a global variation of the aerodynamic coefficient with a local expansion in a convergence zone corresponding to the determined set.

The processing means 5 are also configured to determine the aerodynamic coefficient by plotting a variation curve $C_2(I)$ representative of the second series S2 of values of the aerodynamic coefficient as a function of the number of iterations I.

The processing means 5 are also configured to display the variation curve $C_2(I)$ including an intrinsic zoom (or magnification) of the convergence zone describing the attraction or convergence of the aerodynamic coefficient in detail. This variation curve $C_2(I)$ can be displayed on the output means 9 (for example on a screen or paper medium). The intrinsic and systematic zoom of the convergence zone helps to evaluate the convergence value of the aerodynamic coefficient directly and very precisely.

It should be noted that in general, the values of an aerodynamic coefficient may change sign and pass through zero, which is why it is not appropriate to apply a simple logarithmic scale to the first series S1 of values of the aerodynamic coefficient. Furthermore, direct application of such a scale would not improve the plot because it would increase the size of the zone around zero rather than the size of the zone around the convergence value. This invention solves this problem by ingeniously using two types of scales to apply them simultaneously on the first series S1 of the aerodynamic coefficient values, regardless of its sign change.

It should be noted that the processing means 5 may be configured to add a constant to each term in the first series before applying the monotonic function F to form an intermediate series tending towards zero. Thus, this constant may be chosen to be equal to the value of the aerodynamic coefficient at the determined number of iterations.

Advantageously, the processing means 5 are configured to apply an absolute value operation on the terms in the second series S2 thus forming a third series S3 of positive terms.

Furthermore, in order to eliminate fluctuations, the processing means 5 apply an oscillation filtering operation on the third series S3 to form a fourth series S4.

The fourth series S4 is then represented by a positive monotonic variation curve plotted on the output means 9.

Figure 2:
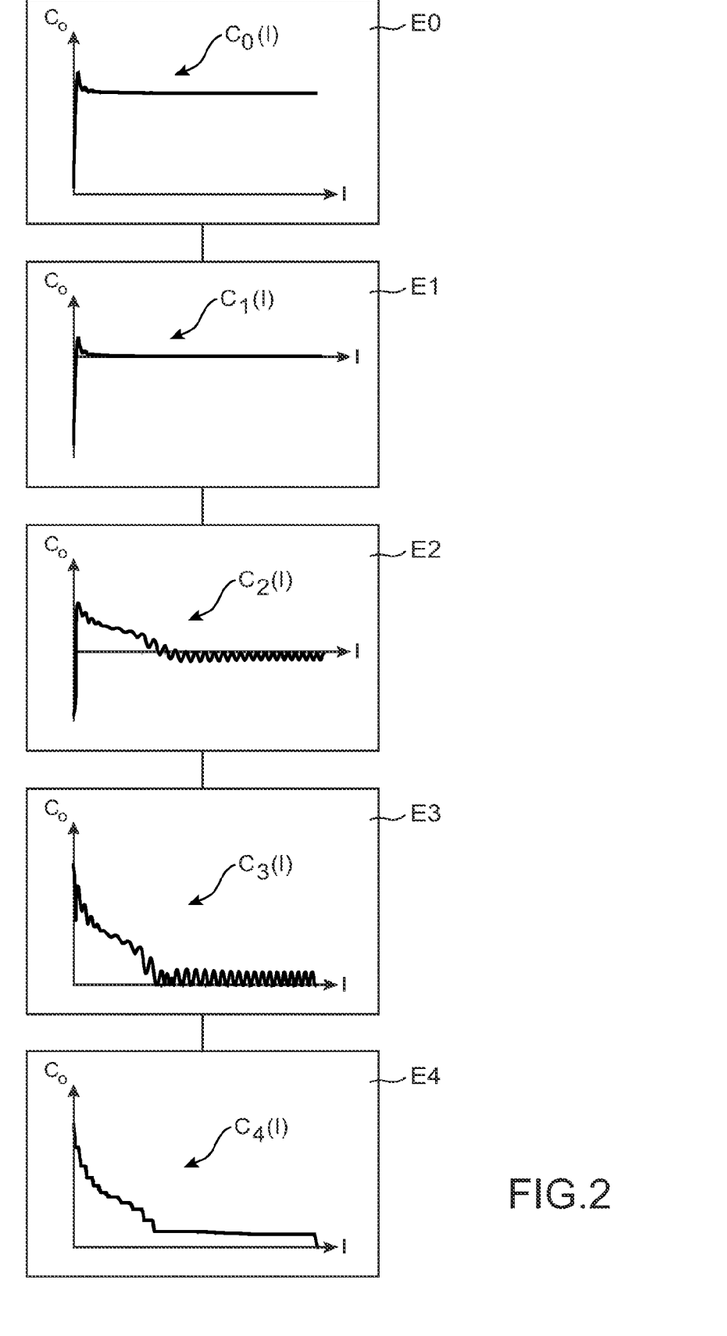
FIG. 2 shows the various steps in a simulation method according to a first embodiment of the invention.

FIG. 2 shows the various steps in a simulation method according to a first embodiment of the invention.

According to this example, a first finite series of values of the coefficient is available in the form of a table giving the value of the aerodynamic coefficient for each number of iterations, this number varying between 1 and a total number of iterations for example equal to 11 000. In the remainder of this document, the aerodynamic coefficient will be denoted C0, the current number of iterations will be denoted I and the total number of iterations will be denoted $I_{max}$.

FIGS. 3A to 3E show plots for the different steps of the method in FIG. 2.

Figure 3A:
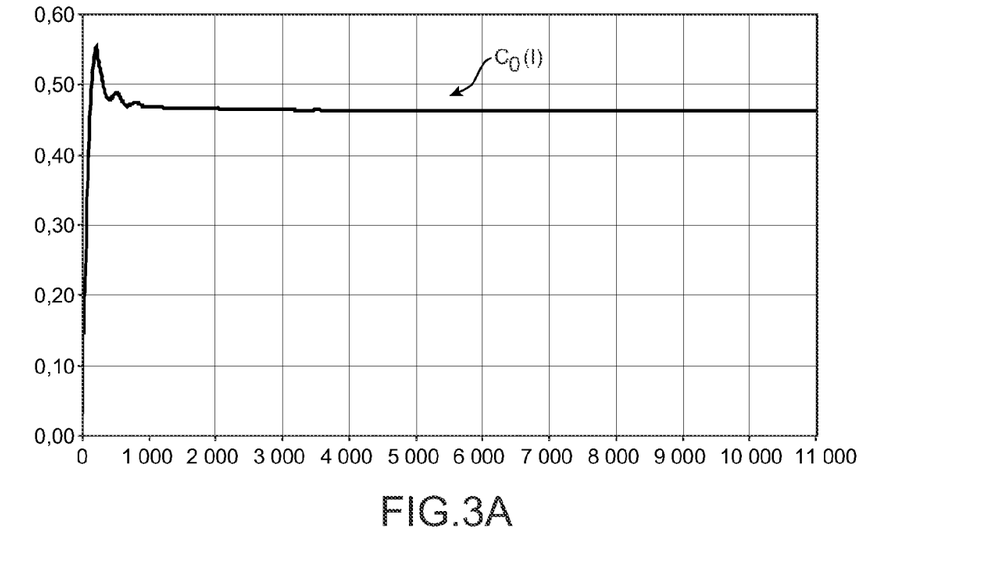
FIGS. 3A to 3E show the plots according to the different steps in the method in FIG. 2.

Step E0 consists of plotting a preliminary variation curve C0(I) representative of the first series S1 of values of the aerodynamic coefficient as a function of the number of iterations I, as shown in the example in FIG. 3A.

The abscissa of the plot of the curve C0(I) is the number of iterations I and its ordinate is the aerodynamic coefficient C0 and this plot is the result of a digital simulation made on an industrial aircraft configuration, using the Navier-Stokes equation. This plot is made conventionally and comprises linear scales for the abscissa and the ordinate.

The purpose of step E1 is to obtain the plot of a function tending towards zero.

For example, the processing means 5 will translate the function or the curve C0(I) by its value C0(Imax) at the total number of iterations Imax. Therefore, the coefficient C1 is defined using the following equation:

$$\forall I; C_1(I) = C_0(I) - C_0(I_{max})$$

Figure 3B:
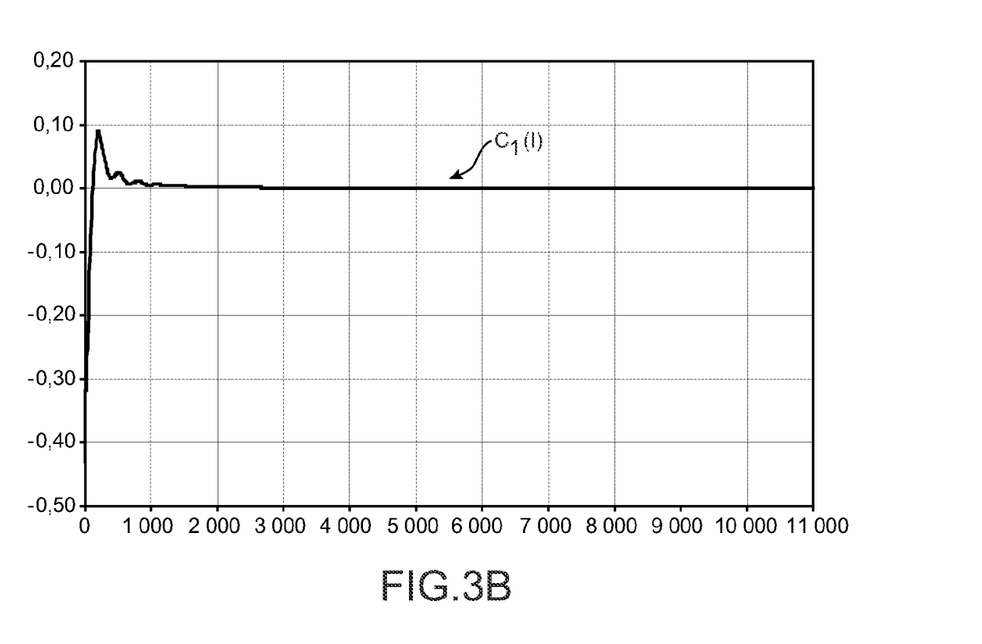

Function C1(I) is then plotted and the plot of curve C1(I) shown in FIG. 3B is obtained on the output means 9, which is a vertical translation of the plot in FIG. 3A.

As a variant and for particular needs, function C0(I) can be translated by its value at an arbitrary number of iterations instead of translating it by its value at the total number of iterations. It could also be translated by an arbitrary value chosen by the user depending on his needs.

Step E2 consists of applying a mixed linear-logarithmic transformation on the function C1(I) to obtain a plot that shows the entire curve and more precisely variations around zero.

This is done by allowing the processing means 5 to calculate firstly the high order of magnitude of function C1(I) that is the relative integer m such that:

$$10^{m-1} < \max |C_1(I)| \leq 10^m$$

m can be calculated using the following equation:

$$m = \text{integer part of } [\log_{10}(\max|C_1(I)|)] + 1$$

The next step is to define the order of magnitude of the precision p, which is strictly less than the high order of magnitude m.

Preferably, the value of p can be fixed as a function of the coefficient C0 considered and the required precision for this coefficient, determined either by general considerations included in the state of the art for the discipline, or by particular considerations related to the study for which digital simulations are made and for which convergence is to be estimated. For example, if the coefficient C0 is the lift coefficient of an aircraft Cz, it might be considered desirable to obtain a precision of 10-3 and in this case, we will fix p=-3.

Alternatively, the value of p could be fixed as a function of m assuming that it is desirable that p should be less than m by a given number of orders of magnitude. For example, if it is required that p should be three orders of magnitude less than m, we will fix p=m-3.

The next step is to define a function C2(I) according to the following equations:

if $|C_1(I)| \leq 10^p$, then $C_2(I) = C_1(I) \cdot 10^{-p}$ and if $|C_1(I)| > 10^p$ then $C_2(I) = \text{sign}(C_1(I)) \cdot [\log_{10}(|C_1(I)|) - p + 1]$, These equations are defined so as to achieve the following properties:

when C1(I) varies within the $[-10^p; 10^p]$ interval, C2(I) varies linearly with C1(I) and is equal to the values ±1 when C1(I) is equal to values ±10p;

when C(I) varies outside the $[-10^p; 10^p]$ interval, C2(I) varies logarithmically with C(I), is equal to values ±1 when C(I) is equal to values ±10p and is equal to values ±(m-p+1) when C1(I) is equal to values ±10m; and C2(I) varies continuously with C1(I), particularly at the limits of the $[-10^p; 10^p]$ interval.

Curve C2(I) is then plotted with linear scales, with the ordinate scale varying from -(m-p+1) to +(m-p+1) and with a gradation step equal to the value 1.

The labels of the ordinate scale are then replaced as follows:

0 is kept;

other values n are replaced by $\text{sign}(n) \cdot 10^{[|n|+p-1]}$.

In particular, this replacement makes it possible to replace ±1 by ±10p and ±(m-p+1) by ±10m. It also means that values adopted by the curve C1(I) can be read although curve C2(I) is actually plotted.

These various operations consist of obtaining a plot of C2(I) that firstly shows the entire curve and also shows variations around zero more precisely.

Figure 3C:
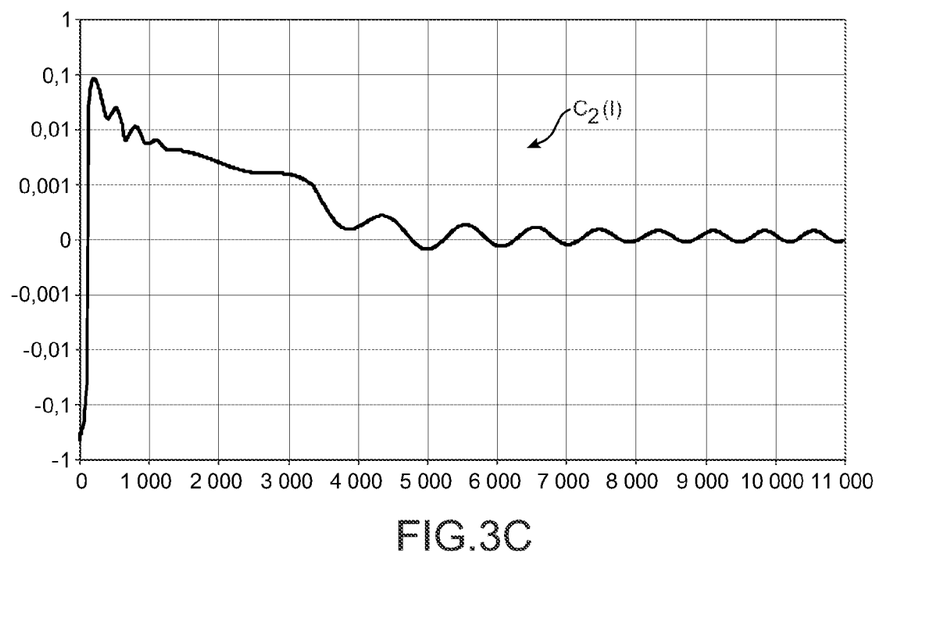

These operations applied on the example considered above (mixed linear-logarithmic transformation and modifications to labels) can result in the curve C2(I) shown in FIG. 3C being plotted using the output means 9, and convergence towards a limit cycle can easily be seen on this plot. In this example, m and p are equal to 0 and -3 respectively, which corresponds to the curve being plotted between ±1 (±100) with a precision equal to ±0.001 (±10-3).

A comparison between the plots of curves C0(I) and C2(I) shows that this invention can:

qualitatively show the variation of the curve that is already visible on the plot of curve C0(I) (for between 0 and 1 500 iterations);

precisely see the variation of the curve when it is very close to its final value (for between 1 500 and 11 000 iterations), which was not possible on the plot of curve C0(I).

As a variant, the labels of the ordinate scale can be modified by shifting them from the final value C0(Imax). In this case, knowing that C0(Imax)=0.463, this would consist of replacing the labels:

-1; -0.1; -0.01; -0.001; 0; 0.001; 0.01; 0.1; 1 by labels:

-0.636; 0.363; 0.453; 0.462; 0.463; 0.464; 0.473; 0.563; 1.463 respectively.

The advantage of this variant is that the value of the coefficient can be read directly, but it has the disadvantage of an irregular scale that is not quite as easy to read.

The purpose of step E3 is to obtain a positive curve.

For this step, the processing means 5 calculate the absolute value of the function C2(I) to obtain the function C3(I):

$$C_3(I) = |C_2(I)|$$

Curve C3(I) is then plotted with linear scales with the ordinate scale varying from 0 to +(m-p+1) and with a gradation step equal to the value 1.

The next step is to replace the labels of the ordinate scale in the same manner as in step E2, in other words as follows:

0 is kept; and the other values n are replaced by: $\text{sign}(n) \cdot 10^{[|n|+p-1]}$.

Figure 3D:
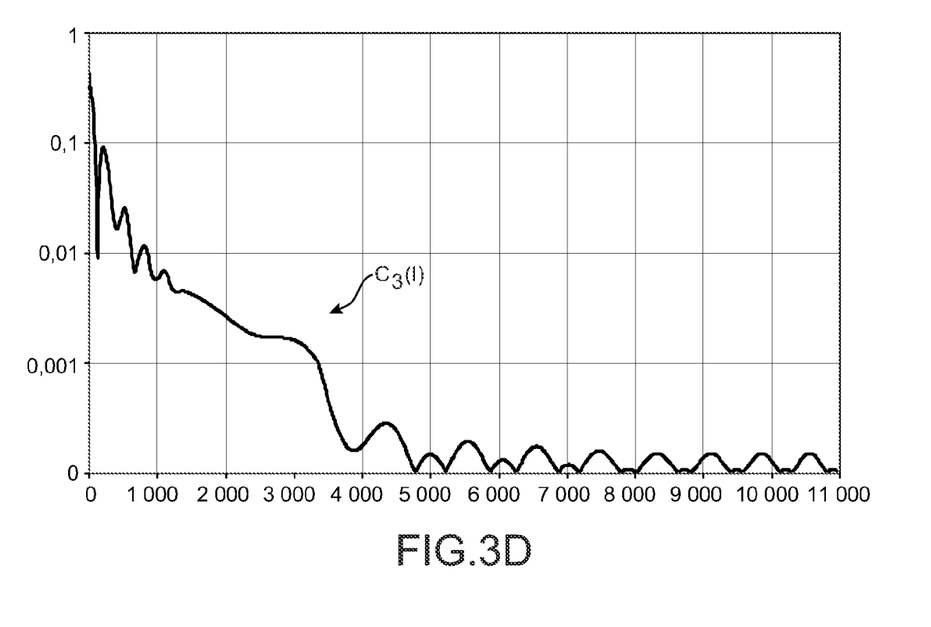

These operations applied for the example considered above give the plot of the curve C3(I) shown in FIG. 3D.

A comparison between the plots of curves C2(I) and C3(I) show that step E3 can obtain a positive curve C3(I) from curve C2(I) oscillating around 0.

In step E4, the processing means determine a function C4(I) defined as being equal to the maximum of the function C3(I) between the current number of iterations I and the total number of iterations Imax according to the following equation:

$$C_4(I) = \max(C_3(J)), J \in [I; I_{max}].$$

Advantageously, function C4(I) can be determined by recurrence for I decreasing from Imax to 1 using the following equations:

$$C_4(I_{max})C_3(I_{max})$$

$$C_4(I)=\max(C_3(I),C_4(I+1)) \text{ pour } I \neq I_{max}$$

Curve C4(I) is then plotted with linear scales with the ordinate scale varying from 0 to +(m−p+1) and a gradation step equal to the value 1.

The labels of the ordinate scale are then replaced in the same way as in steps E2 and E3, in other words as follows:

0 is kept; and the other values n are replaced by: $\text{sign}(n) \cdot 10^{[|n|+p-1]}$.

Figure 3E:
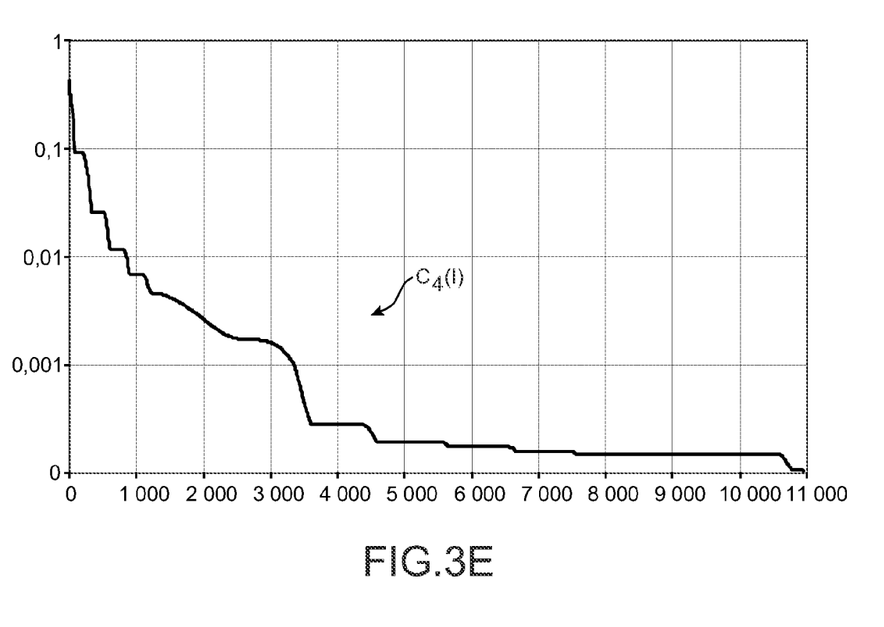

These operations applied to the example considered above give the plot of the curve C4(I) shown in FIG. 3E.

A comparison between the plots of curves C3(I) and C4(I) show that step E4 can give a decreasing monotonic curve C4(I) from a curve C3(I) that is not necessarily monotonic.

It should be noted that among the four plots obtained previously, the plots of curves C1(I) and C3(I) may be observed as intermediate results. All that needs to be kept are the plots of curves C2(I) and C4(I) that are used as supports for analysing the convergence of the digital simulation.

In particular, the plot of the curve C2(I) is similar to the conventional plot of the variation of aerodynamic coefficients (plot of the curve C0(I)) with a zoom of the zone around the final value. This zoom enables a precise analysis of the variation of the coefficient in this zone so that the quality of convergence of the aerodynamic coefficient can be qualified.

The plot of curve C4(I) is similar to a conventional plot of remainders, in other words it represents the reduction of a function towards zero. The ingenuity of the invention is that it can obtain this type of graph for the variation of aerodynamic coefficients, which is useful for evaluating the quality of convergence of the coefficients.

Preferably, the two plots of curves C2(I) and C4(I) can be used jointly to provide further information. The conventional plot of curve C0(I) can also be kept, which has the advantage that users of digital fluid flow simulations are familiar with it. In this case, there would be three plots.

As a variant, all combinations of plots among the five types of plots shown in FIGS. 3A to 3E can be used.

Figure 4:
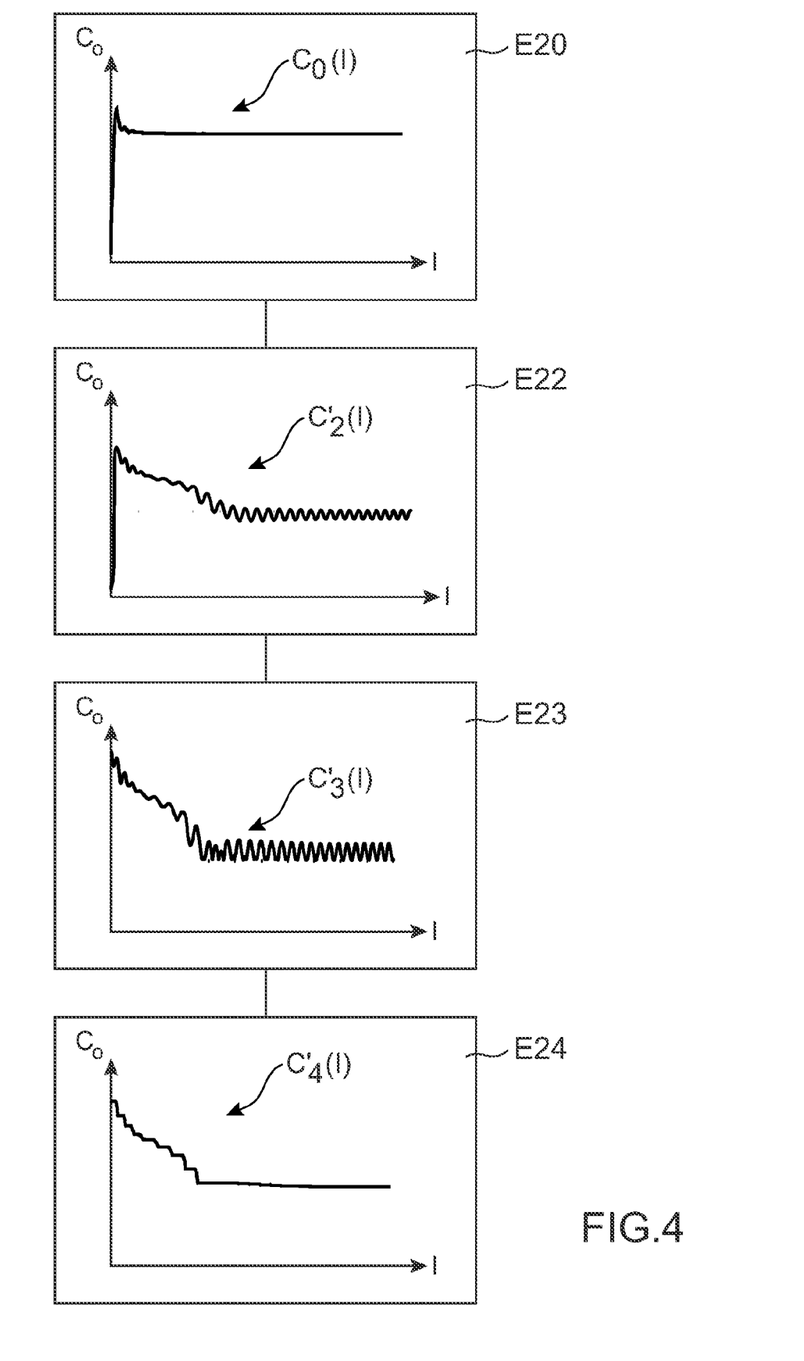
FIG. 4 shows the different steps in a simulation method according to a second embodiment of the invention.

FIG. 4 shows the different steps in a simulation method according to a second embodiment of the invention.

As above, there is a first finite series S1 of values of the aerodynamic coefficient C0 in step E20 in the form of a table containing the value of the coefficient for a number of iterations I varying between 1 and a total number of iterations Imax.

Thus, there is also the plot of the preliminary variation curve C0(I) representative of the first series of values of the aerodynamic coefficient as a function of the number of iterations, as shown in FIG. 3A.

This second embodiment is different from the first, particularly in that the translation of the curve C0(I) is implicitly integrated into the locally expanding transformation.

Step E22 consists of applying a mixed linear-logarithmic transformation onto function C0(I).

To achieve this, the processing means 5 start by calculating a final value $C_{0final}=C_0(I_{max})$, a maximum value $C_{0max}=\max(C_0(I))$, and a minimum value $C_{0min}=\min(C_0(I))$ from the table of values (or from the preliminary variation curve C0(I)). Therefore, by construction: $C_{0min} \leq C_{0final} \leq C_{0max}$.

The next step is to determine the required precision in the form of 10p.

Preferably, p is determined as a function of the nature of the aerodynamic coefficient C0 considered and of the required precision for this coefficient, determined either by general considerations forming part of the state of the art for the discipline, or by particular considerations related to the study for which the digital simulations for which convergence is to be estimated are made. For example, if coefficient C0 is the lift coefficient of an aircraft, it can be assumed that it will be desirable to obtain a precision of 10−3 and in this case p is fixed at −3.

Alternatively, p could be determined as a function of the variation range of the table of values C0(I) and for example we could determine:

p=integer part of $[\log_{10}(C_{0max}-C_{0min})]-3$.

Three real numbers are then defined as follows:

$M_0^p \approx C_{0final}$ to the nearest 10p $I_0^p = M_0^p - 10^p$ $S_0^p = M_0^p + 10^p$.

A series of real numbers $I_0^p, I_0^{p+1}, \ldots, I_0^i, \ldots, I_0^{m-1}, I_0^m$ is then defined recursively as follows:

if $I_0^i > C_{0min}$, $I_0^{i+1}$ is defined as being the real number of type 10i+1 immediately and strictly less than $I_0^i$. Real numbers of type 10i are real numbers for which all numbers below the precision 10i are zero. Recursiveness begins for i=p, $I_0^p$ having been defined beforehand, and stops for i=m when the condition $I_0^i \leq C_{0min}$ is satisfied.

Another series of real numbers $S_0^p, S_0^{p+1}, \ldots, S_0^i, \ldots S_0^{n-1}, S_0^n$ is defined similarly and recursively as follows: if $S_0^i < C_{0max}$, $S_0^{i+1}$ is defined as being the real number of type 10i+1 immediately and strictly greater than $S_0^i$. Recursiveness begins for i=p, $S_0^p$ having been defined beforehand, and stops for i=n when condition $S_0^u \geq C_{0max}$ is satisfied.

These different real numbers form the following ordered series:

$$I_0^m < I_0^{m-1} < \ldots < I_0^i < \ldots < I_0^{p+1} < I_0^p$$
$$< M_0^p < S_0^p < S_0^{p+1} \ldots < S_0^j < \ldots S_0^{n-1} < S_0^n.$$

The following properties are also satisfied by construction:

$C_{0min} \in [I_0^m; I_0^{m-1}[$ $C_{0final} \in ]I_0^p; S_0^p[$ $C_{0max} \in ]S_0^{n-1}; S_0^n]$.

Generally, the next step is to define a lower interval $[I_0^m, I_0^p]$, a median interval $[I_0^p, S_0^p]$ and an upper interval $[S_0^p, S_0^n]$.

It should be noted that the lower interval does not exist in the special case in which m=p, and the upper interval does not exist in the special case in which n=p, and the two conditions can coexist.

The median interval is called the linear zone and the lower and upper intervals are called the logarithmic zone.

The function F(x) is then defined as follows:

$F(x) = x/10^p$ si $|x| \leq 10^p$ (linear zone), and $F(x) = \text{sign}(x) \cdot \log_{10}(|x|/10^{p-1})$ if $|x| > 10^p$ (logarithmic zone).

As before, this function was constructed so as to satisfy the following properties:

it is symmetric and in particular satisfies F(0)=0;

it is strictly monotonic;

it is continuous, including at limits between the linear and logarithmic zones;

it varies linearly in the linear zone and logarithmically in the logarithmic zone (which explains the terms used to refer to these zones);

the slope is greater in the linear zone than in the logarithmic zone, which enables a relative expansion of the linear zone relative to the logarithmic zone when these zones are transformed by application of this function; and in the logarithmic zone, any interval corresponding to an increase of one order of magnitude is transformed into a unit length interval by application of this function.

The next step is to apply a mixed linear-logarithmic monotonic function F(x) on the preliminary variation curve C0(I) using the ordered series of real numbers S to construct a function or variation curve C2'(I) as follows:

$$C_2'(I) = F(C_0(I) - M_0^p)$$

$$I_2^i = F(I_0^i - M_0^p) \forall i \in [p, m]$$

$$S_2^i = F(S_0^i - M_0^p) \forall i \in [p, n]$$

$$M_2^p = F(M_0^p - M_0^p) = F(0) = 0.$$

The next step is to construct a graph with linear scales varying from 1 to Imax for the abscissa axis and from $I_2^m$ to $S_2^n$ for the ordinate axis, the abscissa axis having a conventionally defined grid and the ordinate axis not having a grid.

The next step is to plot a curve on this graph corresponding to the variation function C2'(I), where I and C2 are marked on the abscissa and ordinate axes respectively.

A grid can then be constructed for the ordinate axis as follows:

a straight line is plotted on this graph between point (1, $M_2^p$) and point ($I_{max}$, $M_2^p$) and the number is marked adjacent to this straight line;

a straight line is then plotted on this graph between point (1, $I_2^i$) and point ($I_{max}$, $I_2^i$) for all values i∈[p; m] and the number $I_0^i$ is marked adjacent to this straight line, and a straight line is then plotted on this graph between point (1, $S_2^i$) and point ($I_{max}$, $S_2^i$) for all values i∈[p; n] and the number $S_0^i$ is marked adjacent to this straight line.

These various straight lines then form a grid for the ordinate axis.

The graph thus formed corresponds to the plot of curve C2'(I) which displays the entire preliminary curve C0(I) while showing a relative zoom of the zone of interest formed by the neighbourhood of C0 final.

This second embodiment has the advantage that it provides an ordinate scale that can reconcile the following points:

this scale has a relatively regular grid;

the number of lines in the grid corresponds to the number usually required for a graph (typically between five and ten), at least if n and m are only a few units greater than p, which is usually the case for aerodynamic coefficients and conventional applications on aircraft (otherwise successive orders of magnitude could be marked in pairs, fives, tens, etc. instead of individually);

values corresponding to this grid are composed of a minimum number of digits to facilitate readability; and the initial ordinate scale is kept and can be read directly.

Steps E23 and E24 are identical to steps E3 and E4 described above with reference to FIG. 2.

This second embodiment was applied on a table of values giving the variation of the lift coefficient of an aircraft as a function of the number of iterations. The conventional plot of this variation is shown by curve C0(I) illustrated in FIG. 3A.

The following values are calculated:

$$C0final = 0.4629$$

$$C0max = 0.5537$$

$$C0min = 0.0342$$

$$p = -3$$

$$S = \{0; 0.4; 0.46; 0.462; 0.463; 0.464; 0.47; 0.51\}$$

Figure 5:
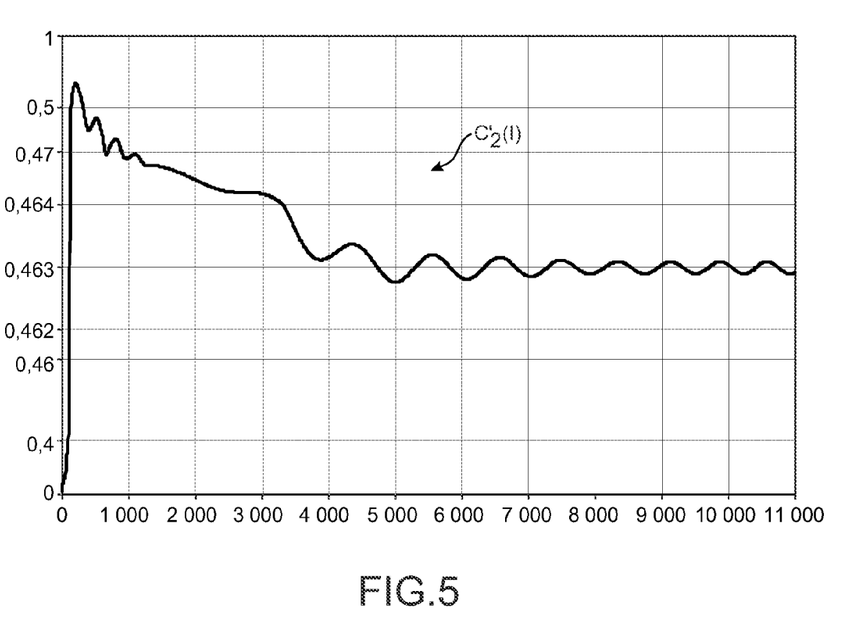
FIG. 5 shows the plot according to a step in the method in FIG. 4.

The plot of curve C2'(I) shown in FIG. 5 can then be obtained.

It should be noted that all steps in the method according to the invention can be programmed on a computer, using the various programming, calculation and plotting features available to the user.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A computer-implemented method, using a computer processor, comprising:

simulating a fluid flow in an aircraft environment to determine at least one aerodynamic coefficient characterizing an aerodynamic behavior of at least one element of the aircraft;

providing a digital solution of equations modelling the fluid flow in said aircraft environment, according to a model configured using physical parameters of the fluid flow, said digital solution being made iteratively to obtain a first series of values of the aerodynamic coefficient indexed by a number of iterations;

defining a criterion for convergence of said aerodynamic coefficient using processing means;

selecting a determined set of terms belonging to said first series of values of the aerodynamic coefficient, as a function of said convergence criterion, using the processing means;

defining a monotonic function configured to make a relatively expanding transformation in said determined set relative to a complement of said set, using the processing means, the transformation being contracting outside said set;

applying said monotonic function on said first series to transform into a second series of values of the aerodynamic coefficient, said second series defining a global change to said aerodynamic coefficient with a local expansion in a convergence zone corresponding to said determined set, using the processing means;

determining said aerodynamic coefficient by plotting a variation curve representative of said second series of values of the aerodynamic coefficient as a function of the number of iterations, using the processing means; and displaying said variation curve including an intrinsic zoom of said convergence zone giving details of the convergence of said aerodynamic coefficient, on output means, wherein a plot of said variation curve includes variations indexed by the number of iterations.

2. The method according to claim 1, wherein said convergence criterion is defined as a function of a predetermined number of iterations.

3. The method according to claim 2, wherein the predetermined number of iterations corresponds to a total number of iterations.

4. The method according to claim 1, wherein a cardinality of said determined set is defined as a function of a predetermined order of magnitude of the aerodynamic coefficient.

5. The method according to claim 1, wherein said monotonic function corresponds to a mixed linear-logarithmic transformation with a linear behavior in said determined set and a logarithmic behavior outside said set, defined as follows:

$$F(x) = \frac{x}{10^p} \text{ if } |x| \leq 10^p \text{ and}$$

$$F(x) = \text{sign}(x) \cdot \log_{10}\left(\frac{|x|}{10^{p-1}}\right) \text{ if } |x| > 10^p$$

where p is an order of magnitude of precision, and x is said aerodynamic coefficient.

6. The method according to claim 2, further comprising adding a constant to each term in the first series before application of said monotonic function, said constant being equal to the value of the aerodynamic coefficient at a determined number of iterations.

7. The method according to claim 6, further comprising applying an absolute value operation on the terms of said second series to transform into a third series of positive terms.

8. The method according to claim 7, further comprising the following steps:
   applying an oscillation filtering operation on said third series to transform into a fourth monotonic series; and
   plotting a positive and monotonic variation curve representative of said fourth series.

9. The method according to claim 5, further comprising the following steps:
   plotting a preliminary variation curve $C_0(I)$ representative of said first series of values of the aerodynamic coefficient as a function of the number of iterations,
   defining at least one interval of values of the aerodynamic coefficient corresponding to said determined set,
   applying said mixed linear-logarithmic monotonic function on said preliminary variation curve operating a linear transformation inside said interval and a logarithmic transformation outside said interval to form said variation curve.

10. The method according to claim 9, further comprising the steps:
   calculating a final value $C_{0final} = C_0(I_{max})$, a maximum value $C_{0max} = \max(C_0(I))$, and a minimum value $C_{0min} = \min(C_0(I))$ of said preliminary variation curve $C_0(I)$,
   recursively defining a fifth decreasing series $I_0^p$, $I_0^{p+1}, \ldots, I_0^i, \ldots, I_0^{m-1}, I_0^m$ such that $I_0^i > C_{0min} \forall i \in [p, m-1]$, $I_0^m \leq C_{0min}$, $I_0^p = M_0^p - 10^p$, and $M_0^p \leq C_{0final}$ to the nearest 10p, where p is an order of magnitude of precision,
   recursively defining a sixth increasing series $S_0^p$, $S_0^{p+1}, \ldots, S_0^i, \ldots, S_0^{n-1}, S_0^n$, such that $S_0^i < C_{0max} \forall i \in [p, n-1]$, $S_0^n \geq C_{0max}$ and $S_0^p = M_0^p + 10^p$,
   defining a seventh ordered series as a function of said fifth and sixth series: $I_0^m < I_0^{m-1} < \ldots < I_0^i < \ldots < I_0^{p+1} < I_0^p < M_0^p < S_0^p < S_0^{p+1} \ldots < S_0^i < \ldots < S_0^{n-1} < S_0^n$,
   defining a lower interval $[I_0^m, I_0^p]$, a median interval $[I_0^p, S_0^p]$, and an upper interval $[S_0^p, S_0^n]$,
   applying said mixed linear-logarithmic monotonic function on said preliminary variation curve using said seventh ordered series to form said variation curve as follows:

$$C_2'(I) = F(C_0(I) - M_0^p)$$

$$I_2^i = F(I_0^i - M_0^p) \forall i \in [p, m]$$

$$S_2^i = F(S_0^i - M_0^p) \forall i \in [p, n]$$

$$M_2^p = F(M_0^p - M_0^p) = F(0) = 0$$

wherein C denotes a coefficient value, I denotes a number of iterations, and S denotes a series of the coefficient values.

11. The method according to claim 9, wherein defining said interval comprises the steps:
   translating said preliminary variation curve by the value of the aerodynamic coefficient at the total number of iterations to form an intermediate variation curve,
   determining a high order of magnitude m relative to said intermediate variation curve, defined as being the relative integer m such that:

$$10^{m-1} < \max|C_1(I)| \leq 10^m, \text{ and}$$

defining said interval by extremities equal to $-10p$ and $10p$ where p is an order of magnitude of precision that is strictly less than said high order of magnitude m, and
   applying said mixed linear-logarithmic monotonic function on said intermediate variation curve using said ordered series to form said variation curve as follows:

$$C_2'(I) = C_1(I) \cdot 10^{-p} \text{ for } |C_1(I)| \leq 10^p, \text{ and}$$

wherein C denotes a coefficient value, and I denotes a number of iterations.

12. The method according to claim 9, further comprising the steps:
   applying an absolute value on said variation curve to form a positive variation curve $C_3(I)$, and
   plotting a positive monotonic variation curve $C_4(I)$ using a recurrence calculation for I decreasing between Imax and 1, according to the following equations:

$$C_4(I_{max}) = C_3(I_{max})$$

$$C_4(I) = \max(C_3(I), C_4(I+1)) \text{ pour } I \neq I_{max}$$

$$C_4(I_{max}) = C_3(I_{max})$$

$$C_4(I) = \max(C_3(I), C_4(I+1)) \text{ for } I \neq I_{max}$$

wherein C denotes a coefficient value, and I denotes a number of iterations.

13. A computer product comprising computer-executable instructions stored in non-transient memory which, when executed, instructs a computer to perform the computer-executable instructions using a computer processor, comprising the instructions to:
   simulate a fluid flow in an aircraft environment to determine at least one aerodynamic coefficient characterizing an aerodynamic behavior of at least one element of the aircraft;
   provide a digital solution of equations modelling the fluid flow in said aircraft environment, according to a model configured using physical parameters of the fluid flow, said digital solution being made iteratively to obtain a first series of values of the aerodynamic coefficient indexed by a number of iterations;
   define a criterion for convergence of said aerodynamic coefficient using processing means;
   select a determined set of terms belonging to said first series of values of the aerodynamic coefficient, as a function of said convergence criterion, using the processing means;
   define a monotonic function configured to make a relatively expanding transformation in said determined set relative to a complement of said set, using the processing means, the transformation being contracting outside said set;

apply said monotonic function on said first series to transform into a second series of values of the aerodynamic coefficient, said second series defining a global change to said aerodynamic coefficient with a local expansion in a convergence zone corresponding to said determined set, using the processing means;

determine said aerodynamic coefficient by plotting a variation curve representative of said second series of values of the aerodynamic coefficient as a function of the number of iterations, using the processing means; and display said variation curve including an intrinsic zoom of said convergence zone giving details of the convergence of said aerodynamic coefficient, on output means, wherein a plot of said variation curve includes variations indexed by the number of iterations.

* * * * *